United States Patent
Lay et al.

(10) Patent No.: US 12,264,518 B2
(45) Date of Patent: Apr. 1, 2025

(54) ESCAPE HATCH STAY SYSTEM

(71) Applicant: Textron Aviation Inc., Wichita, KS (US)

(72) Inventors: Michael Clinton Lay, Sedgwick, KS (US); Evan M. Johnson, Wichita, KS (US); Isaac Anthony Hoetmer, Wichita, KS (US); Joel Allen Pegg, Wichita, KS (US); Edward Donald Harrison, Hutchinson, KS (US)

(73) Assignee: Textron Innovations Inc., Providence, RI (US)

( * ) Notice: Subject to any disclaimer, the term of this patent is extended or adjusted under 35 U.S.C. 154(b) by 118 days.

(21) Appl. No.: 18/354,239

(22) Filed: Jul. 18, 2023

(65) Prior Publication Data

US 2024/0018813 A1    Jan. 18, 2024

Related U.S. Application Data

(60) Provisional application No. 63/390,105, filed on Jul. 18, 2022.

(51) Int. Cl.
| | |
|---|---|
| *B64C 1/14* | (2006.01) |
| *E05B 41/00* | (2006.01) |
| *E05B 85/10* | (2014.01) |
| *E05C 17/32* | (2006.01) |
| *E05F 1/10* | (2006.01) |

(52) U.S. Cl.
CPC ............ *E05C 17/32* (2013.01); *B64C 1/1423* (2013.01); *E05B 41/00* (2013.01); *E05B 85/10* (2013.01); *E05F 1/1091* (2013.01)

(58) Field of Classification Search
CPC ....... E05F 1/1091; E05C 17/32; B64C 1/1423
See application file for complete search history.

(56) References Cited

U.S. PATENT DOCUMENTS

| | | | |
|---|---|---|---|
| 2,631,032 A | 3/1953 | Denker et al. | |
| 3,032,834 A | 5/1962 | Carlson | |
| 3,144,224 A | 8/1964 | Carroll | |
| 4,510,714 A * | 4/1985 | Kasper | B64C 1/1415 49/249 |
| 4,601,446 A * | 7/1986 | Opsahl | B64C 1/1415 49/386 |
| 4,879,843 A * | 11/1989 | Hamamoto | B64C 1/1407 49/176 |

(Continued)

FOREIGN PATENT DOCUMENTS

EP    2764192 A1    8/2014

*Primary Examiner* — Tye William Abell
(74) *Attorney, Agent, or Firm* — Avek IP, LLC

(57) ABSTRACT

An escape hatch stay system for an aircraft and methods of using the escape hatch stay system. An escape hatch stay system includes a first stop arm, a second stop arm, and a gas strut. The first stop arm is rotatably coupled to the second stop arm, and the second stop arm is pivotably coupled to the gas strut. The first and second stop arms are lockable to preclude relative movement therebetween to lock the escape hatch in an open position. When the escape hatch is in the open position, the escape hatch may not be closed shut without manual intervention. When the escape hatch is in the open position, a load applicable to push the escape hatch open past the open position is damped by the gas strut.

20 Claims, 18 Drawing Sheets

(56) References Cited

U.S. PATENT DOCUMENTS

| | | | |
|---|---|---|---|
| 5,031,863 A * | 7/1991 | Noble | B64C 1/1407 |
| | | | D12/345 |
| 5,064,147 A | 11/1991 | Noble et al. | |
| 5,931,415 A * | 8/1999 | Lingard | B64C 1/143 |
| | | | 74/105 |
| 6,341,748 B1 | 1/2002 | Brooks et al. | |
| 7,896,290 B2 | 3/2011 | Saku et al. | |
| 9,511,846 B2 | 12/2016 | Auriac et al. | |
| 2010/0252679 A1 | 10/2010 | Sütthoff et al. | |
| 2018/0134366 A1* | 5/2018 | Merkel | B64C 1/1423 |
| 2020/0181943 A1 | 6/2020 | Savidge et al. | |

* cited by examiner

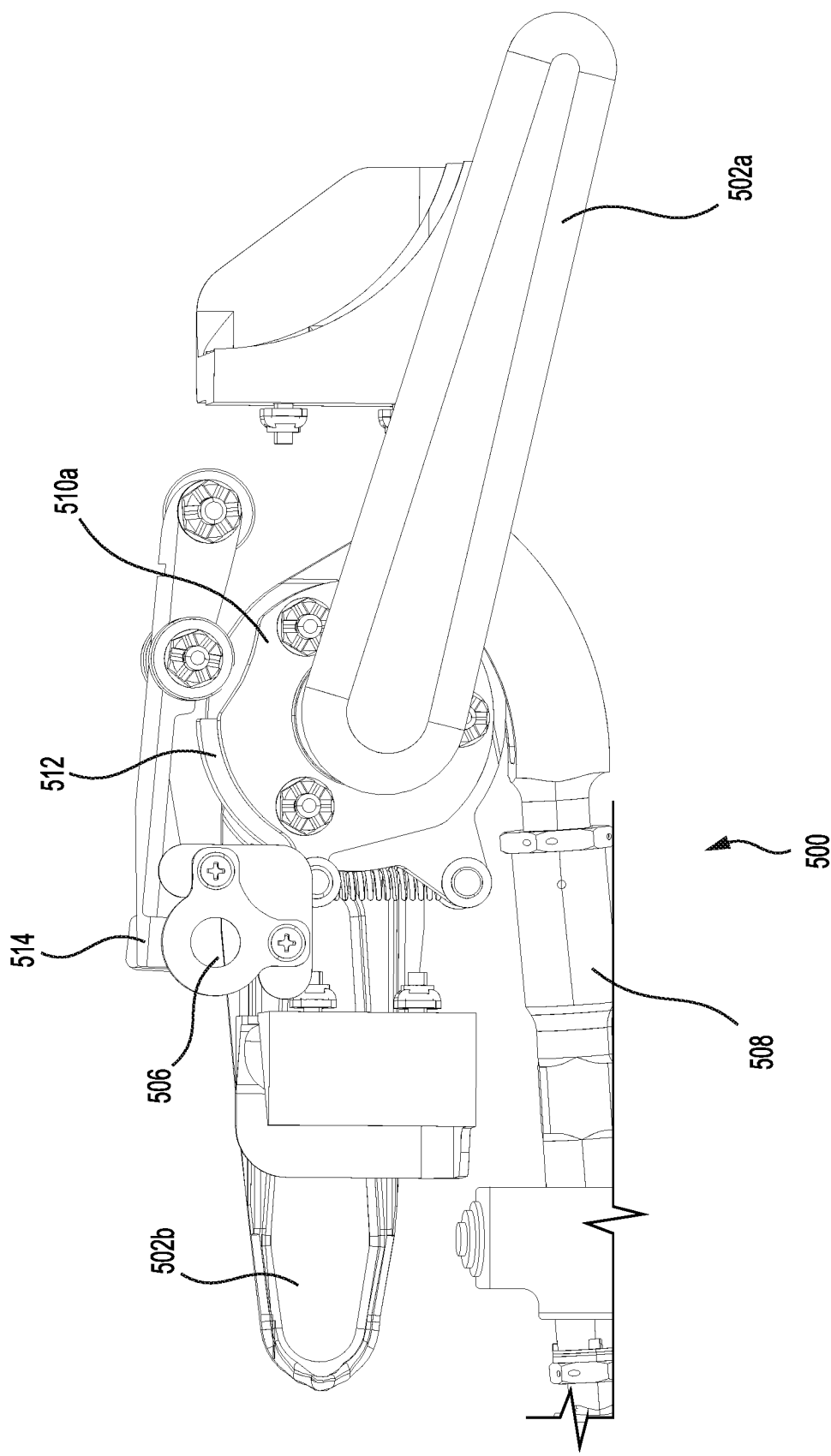

ESCAPE HATCH STAY SYSTEM

CROSS-REFERENCE TO RELATED APPLICATIONS

This application claims priority to U.S. Provisional Patent Application, Ser. No. 63/390,105, filed Jul. 18, 2022, and titled "Escape Hatch Stay and Handle Assembly for Aircraft," the disclosure of which is incorporated herein by reference in its entirety.

BACKGROUND OF THE INVENTION

1. Field

The disclosed aspects relate generally to aircraft doors. More specifically, the aspects relate to aircraft escape hatches and systems and methods for operating same.

2. Description of the Related Art

Escape hatches for aircraft have been described in the prior art. U.S. Patent Application Publication No. 2010/0252679 to Sutthoff et al. describes an emergency exit hatch for exiting a cabin module of an aircraft. U.S. Pat. No. 9,511,846 to Auriac et al. describes an escape opening for an airplane that is closed off by an external emergency door and an internal emergency hatch. European Patent No. 2,764,292 to Kelly describes a door with an escape hatch.

Handle assemblies have also been described in the prior art. U.S. Patent Application Publication No. 2020/0181943 to Savidge et al. describes an aircraft escape hatch having an interior handle and an exterior handle. U.S. Pat. No. 6,441,748 to Brooks et al. describes a handle for an emergency exit system for aircraft. U.S. Pat. No. 5,064,247 to Noble et al. describes an upward-opening plug-type door with a latching and lifting mechanism for use as an aircraft escape hatch. U.S. Pat. No. 3,032,834 to Carlson describes a handle with latch arms for a releasable escape door device for use on a vehicle. U.S. Pat. No. 3,244,324 to Carroll describes an emergency escape hatch with a handle having two parallel grooves for gripping.

SUMMARY

The systems, methods and devices of this disclosure each have several innovative aspects, no single one of which is solely responsible for the desirable attributes disclosed herein.

In an aspect, an escape hatch stay system for an escape hatch of an aircraft is provided. The escape hatch stay system has a first stop arm that includes a first end and a second end. The second end has associated therewith a protruding member and a catch. The protruding member includes a stop. The escape hatch includes a second stop arm that has a first end and a second end. The second end of the second stop arm has associated therewith a connecting member. The connecting member includes a gap, an end stop surface, and a projection. The escape hatch stay system has a gas strut having a first end and a second end. The second end of the gas strut is coupled to the escape hatch. The escape hatch stay system has a bracket pivotably coupled to the escape hatch. The first end of the second stop arm and the first end of the gas strut are each attached to the bracket. The first end of the first stop arm is coupled to a supporting structure of the aircraft and the second end of the first stop arm is rotatably coupled to the second stop arm. The first stop arm and the second stop arm are rotatably locked relative to each other to maintain the escape hatch in an open position when the stop abuts the end stop surface and the projection interfaces with the catch. The gas strut is configured to dampen a load applicable to push the escape hatch open past the open position.

In some aspects, according to any one of the preceding aspects, the catch has a lock end and a trigger end.

In some aspects, according to any one of the preceding aspects, the trigger end is movable to selectively unlock the first stop arm from the second stop arm.

In some aspects, according to any one of the preceding aspects, the gas strut includes a rate-controlled damping strut.

In some aspects, according to any one of the preceding aspects, the first stop arm and the second stop arm are each in an extended position when the first stop arm is rotatably locked relative to the second stop arm.

In some aspects, according to any one of the preceding aspects, the first stop arm and the second stop arm are generally parallel to and laterally displaced from each other when the escape hatch is in a closed position.

In some aspects, according to any one of the preceding aspects, a fastener extends through each of the protruding member and the connecting member to rotatably couple the second end of the first stop arm to the second end of the second stop arm.

In some aspects, according to any one of the preceding aspects, the connecting member has a first wall and a second wall facing the first wall, and the projection includes a first projection associated with the first wall and a second projection associated with the second wall.

One innovative aspect of the disclosure can be implemented as a method of using an escape hatch on an aircraft. The method comprises movably coupling a second end of a first stop arm to a second end of a second stop arm. The method includes attaching a first end of the second stop arm and a first end of a gas strut to a bracket that is movably coupled to the escape hatch. The method includes locking the escape hatch in an open position by locking the first stop arm and the second stop arm such that there is no relative movement therebetween. The method includes damping, using the gas strut, a load applicable to push the escape hatch open past the open position. The method comprises disassociating a catch of the first stop arm from a projecting member of the second stop arm to unlock the escape hatch.

In some aspects, according to any one of the precent aspects, the method includes attaching a first end of the first stop arm to a support structure of the aircraft.

In some aspects, according to any one of the precent aspects, the method includes attaching a second end of the gas strut to the escape hatch.

In some aspects, according to any one of the precent aspects, the catch is V-shaped and has a trigger end and a lock end.

In some aspects, according to any one of the precent aspects, disassociating the catch from the projecting member includes disassociating the lock end from the projecting member using the trigger end.

In some aspects, according to any one of the precent aspects, the first stop arm, at the second end thereof, includes a protruding member with an opening.

In some aspects, according to any one of the precent aspects, the second stop arm, at the second end thereof, includes a connecting member with a hole and a stop.

In some aspects, according to any one of the precent aspects, the escape hatch moves from a closed position to the open position in a clockwise direction.

One innovative aspect of the disclosure can be implemented as an escape hatch stay system for an escape hatch of an aircraft. The escape hatch stay system includes a first stop arm, a second stop arm, and a gas strut. The second stop arm is rotatably coupled to the first stop arm and is pivotably coupled to the gas strut via a bracket. The first stop arm is rotatably lockable relative to the second stop arm to lock the escape hatch in an open position. A load applicable to push the escape hatch open past the open position is damped by the gas strut.

In some aspects, according to any one of the preceding aspects, the escape hatch stay system includes a catch with a trigger end and a lock end.

In some aspects, according to any one of the preceding aspects, the catch is associated with a second end of the first stop arm.

In some aspects, according to any one of the preceding aspects, the escape hatch stay system includes a projection configured to interface with the catch to lock the first stop arm relative to the second stop arm.

In some aspects, according to any one of the preceding aspects, the first stop arm is coupled to a supporting structure that surrounds the escape hatch.

BRIEF DESCRIPTION OF THE SEVERAL VIEWS OF THE DRAWINGS

Illustrative aspects are described in detail below with reference to the attached drawing figures, which are incorporated by reference herein and wherein:

FIG. 5D illustrates an interior planar view of the handle assembly for some aspects;

Figure 1:
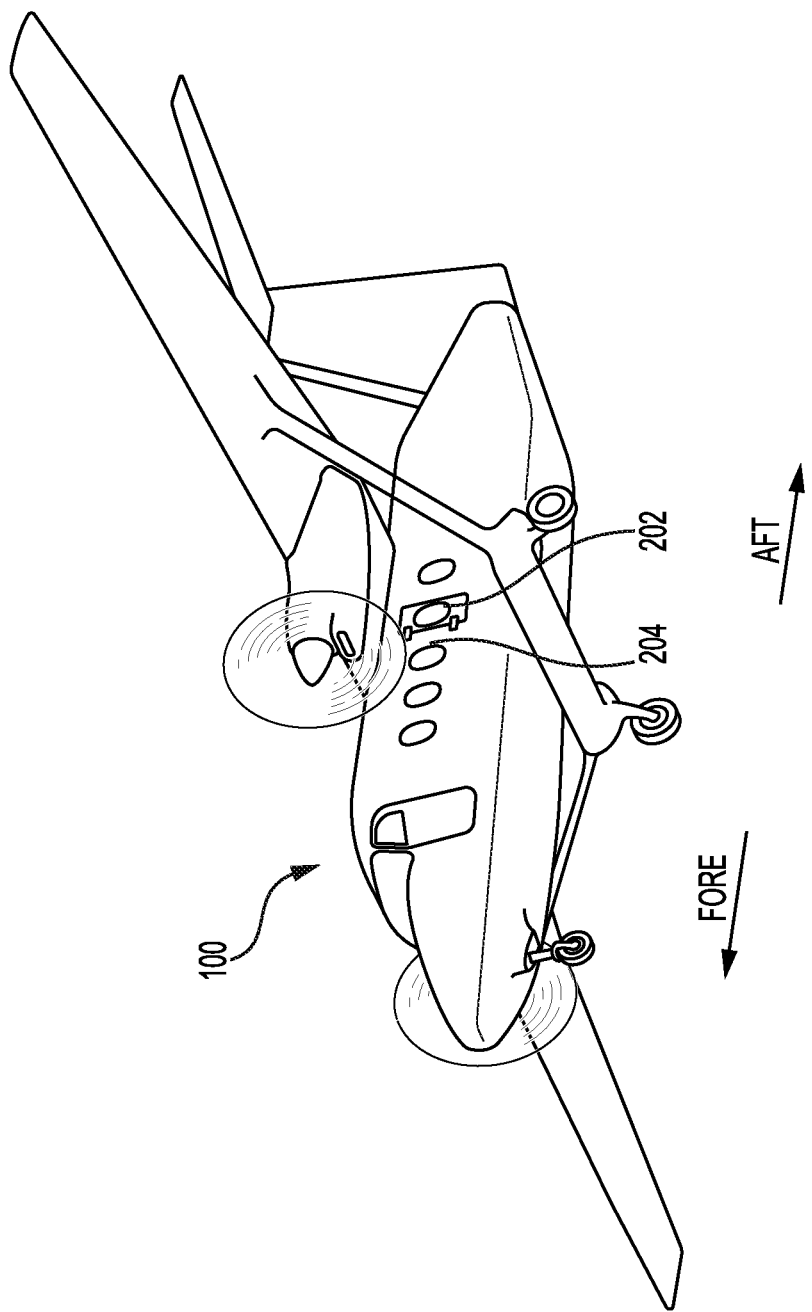
FIG. 1 illustrates an exemplary aircraft for some aspects.

The drawing figures do not limit the invention to the specific aspects disclosed and described herein. The drawings are not necessarily to scale, emphasis instead being placed upon clearly illustrating the principles of the invention.

DETAILED DESCRIPTION

The following detailed description references the accompanying drawings that illustrate specific aspects in which the invention can be practiced. The aspects are intended to describe aspects of the invention in sufficient detail to enable those skilled in the art to practice the invention. Other aspects can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one aspect," "an aspect," or "aspects" mean that the feature or features being referred to are included in at least one aspect of the technology. Separate references to "one aspect," "an aspect," or "aspects" in this description do not necessarily refer to the same aspect and are also not mutually exclusive unless so stated and/or except as will be readily apparent to those skilled in the art from the description. For example, a feature, structure, act, etc. described in one aspect may also be included in other aspects, but is not necessarily included. Thus, the technology can include a variety of combinations and/or integrations of the aspects described herein.

Various aspects relate generally to an escape hatch stay system for a vehicle. Some aspects more specifically relate to an escape hatch stay system configured to prevent the escape hatch from over rotating when in an open position due to an applied load (e.g., a gust of wind). The escape hatch stay system may comprise a first stop arm movably (e.g., rotatably) coupled to a second stop arm. The first stop arm and the second stop arm may be configured to over-center when the escape hatch is opened. When in the over-center position, the stop arms may prevent the escape hatch from closing shut and may require a user to manually move the stop arms out of the over-center position to close the escape hatch. A gas strut may be coupled to the escape hatch and to the second stop arm via a pivotable over travel mechanism. When the first stop and the second stop arm are in the over-center position, and a load is applied to the escape hatch, the gas strut may dampen excessive force and store energy from the applied load, and then release stored energy as the over-travel mechanism returns to nominal position, with escape hatch still in open position.

Some aspects relate more specifically to a handle assembly for the escape hatch system. The handle assembly may comprise an interior handle and an exterior handle for opening the escape hatch. Two locking systems may be provided, one for the handle assembly and the other for the escape hatch. In aspects, the escape hatch may be opened using the handle assembly only after each of the two locking systems are unlocked. To improve the user experience and efficiency of egress, the handle assembly may be configured to unlock both locking systems through a single rotational input that may be applied by a person with a single hand. As the handle assembly is rotated through a first arc of rotation, a series of cam plates may be driven and unlock the handle assembly. Rotating the handle assembly through a second arc of rotation, which may be successive to the first arc of rotation, may unlock the second locking system, permitting opening of the escape hatch.

Escape Hatch Stay System

FIG. 1 illustrates a vehicle 100 of some aspects in which an escape hatch 202 may be located. Vehicle 100 may be a plane, helicopter, aircraft, boat, submarine, car, train, spacecraft, or any other vehicle with an escape hatch. While vehicle 100 may comprise any of the aforementioned options, vehicle 100 may be referred to as an aircraft for conciseness and clarity throughout the present disclosure. Vehicle 100 includes a supporting structure 204 that may surround escape hatch 202. In aspects, escape hatch 202 is rotatably coupled to supporting structure 204 such that escape hatch 202 pivots around an axis to open or close relative to supporting structure 204. In aspects, supporting structure 204 receives all or part of escape hatch 202 when in a closed position.

Figure 2A:
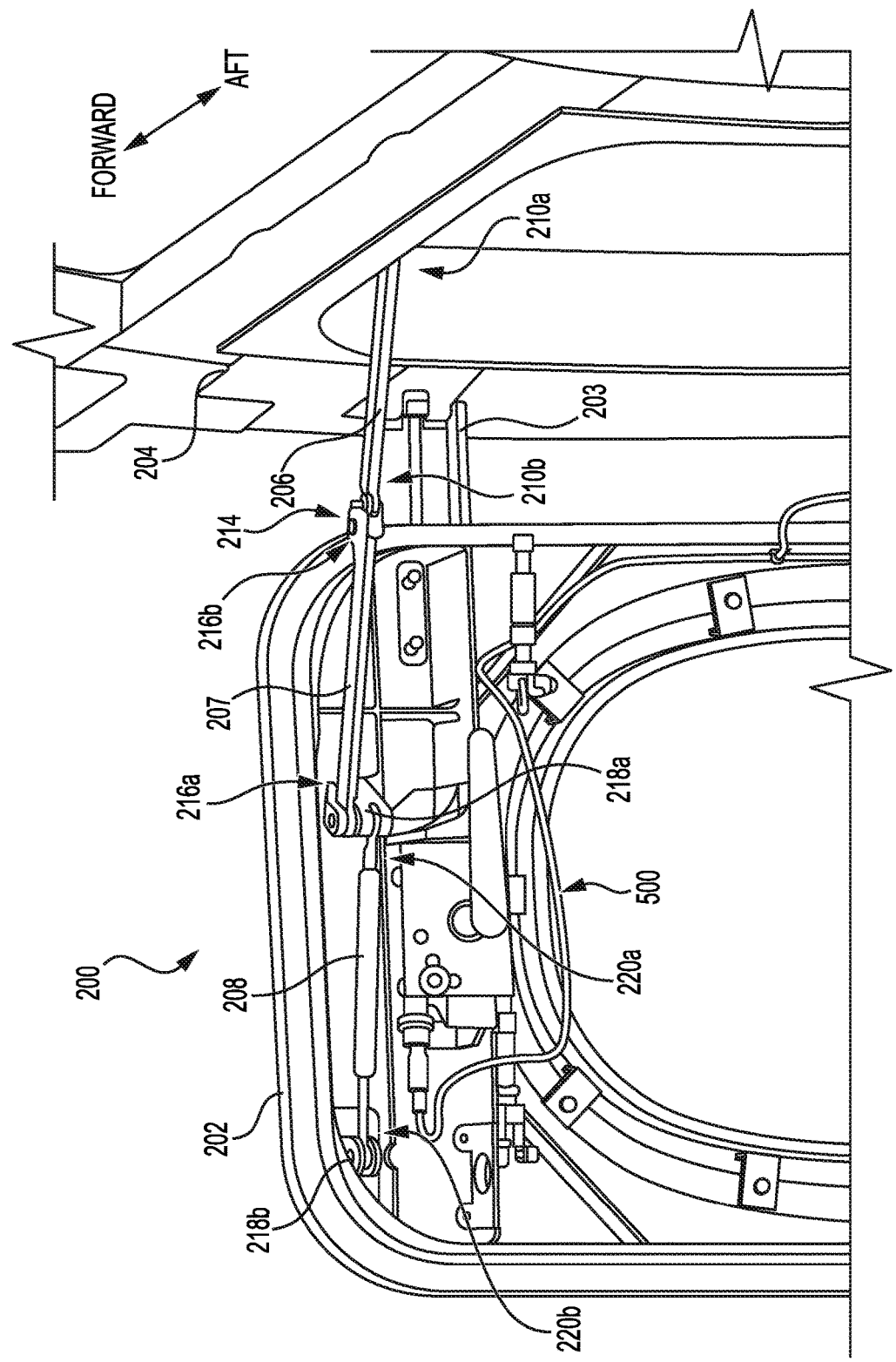
FIG. 2A illustrates an escape hatch with an escape hatch stay system in an open position for some aspects.

FIG. 2A illustrates an interior view of an escape hatch assembly for some aspects. The escape hatch assembly may comprise an escape hatch stay system 200 for escape hatch 202. Escape hatch 202 may be pivotably connected (e.g., via hinges 203) to supporting structure 204. In some aspects, escape hatch 202 is configured to open into the airstream and may be used for egress by flight crew and/or passengers on an aircraft in case of an emergency. For example, escape hatch 202 may be located in the cockpit of an aircraft to provide an emergency exit for the pilot. As another example, escape hatch 202 may be located in a cabin of the aircraft for passenger egress. Supporting structure 204 may be a portion of an aircraft fuselage, such as an airframe. When in a closed position, escape hatch 202 may be received within supporting structure 204.

Escape hatch stay system 200 may be configured to hold escape hatch 202 in an open position to allow for passenger egress while also limiting a travel distance of escape hatch 202. System 200 may be configured to protect supporting structure 204 and escape hatch 202 from damage due to a load applied to escape hatch 202 when escape hatch 202 is opened, as discussed in further detail below. Also illustrated in FIG. 2A is handle assembly 500 for opening escape hatch 202, which is described below with respect to FIGS. 5A-5I.

In some aspects, escape hatch stay system 200 may comprise a first stop arm 206, a second stop arm 207, and a gas strut 208. The first stop arm 206 may be operatively coupled to one end of the second stop arm 207 and to supporting structure 204. The gas strut 208 may be operatively coupled to the other end of the second stop arm 207 and to escape hatch 202. First stop arm 206 and second stop arm 207 may be placed in an over-center position to lock escape hatch 202 in an open position, to allow for easy egress of occupants. Loads applied to escape hatch 202 when first stop arm 206 and second stop arm 207 are in the over-center position may be dampened by gas strut 208 to ensure that the escape hatch 202 does not open further uncontrollably and damage support structure 204 or escape hatch 202.

Figure 2B:
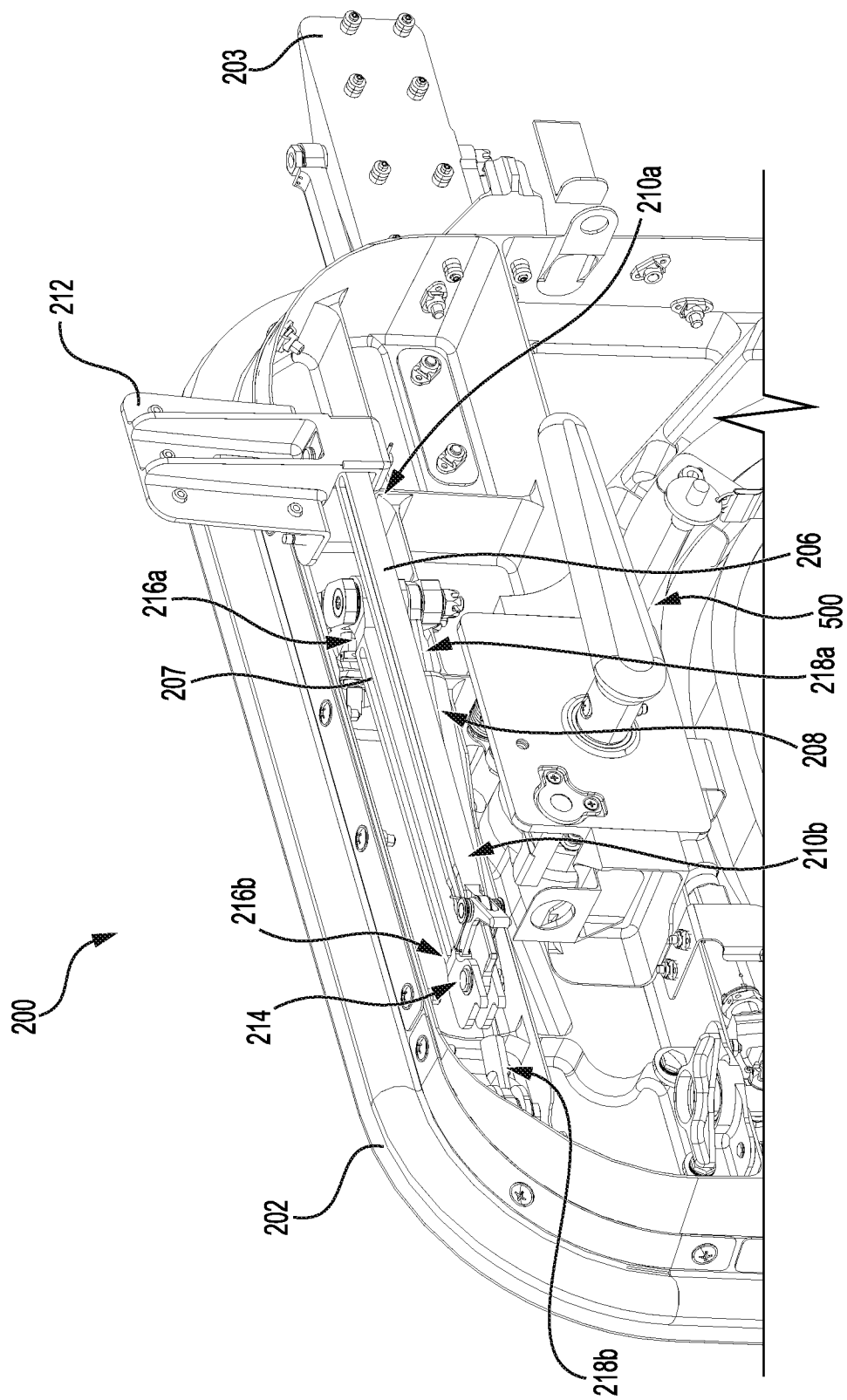
FIG. 2B illustrates a close-up view of the escape hatch in a closed position for some aspects.
Figure 3A:
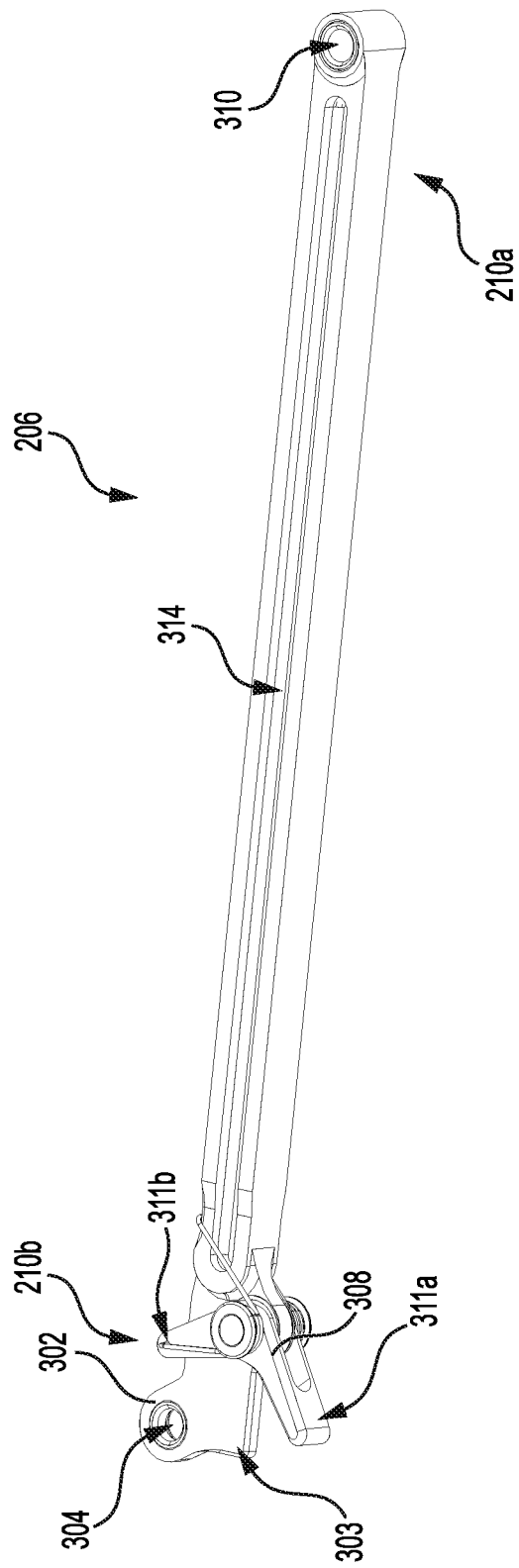
FIG. 3A illustrates a first stop arm of the escape hatch stay system for some aspects.

First stop arm 206 may comprise a first end 210a and a second end 210b (see FIGS. 2A and 3A). As shown in FIG. 3A, first stop arm 206 may be substantially rectangular. In some aspects, first stop arm 206 may comprise a grooved portion 314 on a top side and a bottom side thereof. At first end 210a, first stop arm 206 may be attached to supporting structure 204 via a supporting structure bracket 212 (see FIG. 2B).

Second stop arm 207 may be substantially rectangular (see FIG. 3B), and akin to first stop arm 206, second stop arm 207 may comprise a grooved portion 326 on a top side and a bottom side thereof. Second stop arm 207 may comprise a first end 216a and a second end 216b.

Figure 3B:
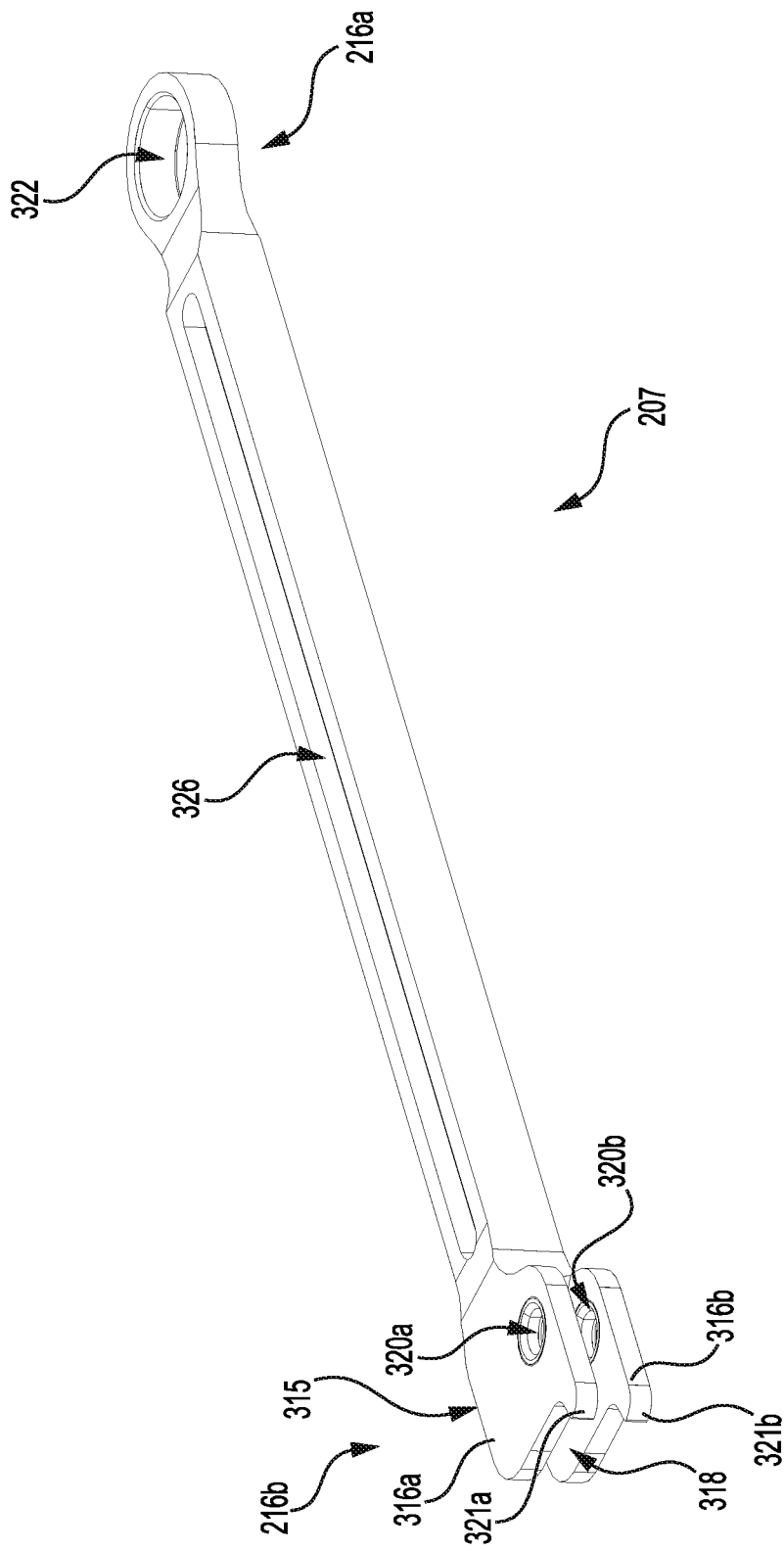
FIG. 3B illustrates a second stop arm of the escape hatch stay system for some aspects.
Figure 3C:
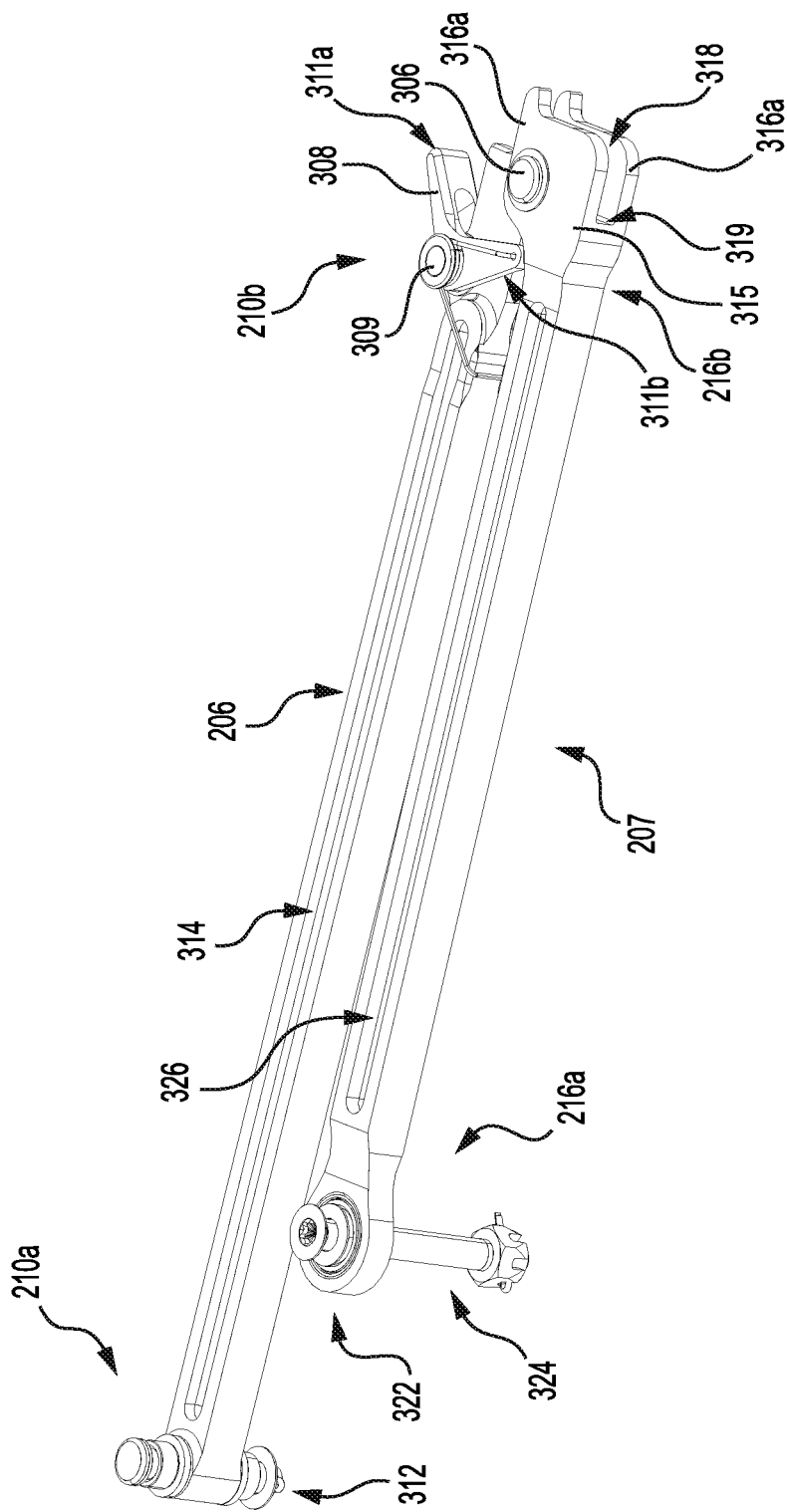
FIG. 3C illustrates a perspective view of the first stop arm and the second stop arm pivotally coupled to each other, for some aspects.
Figure 4:
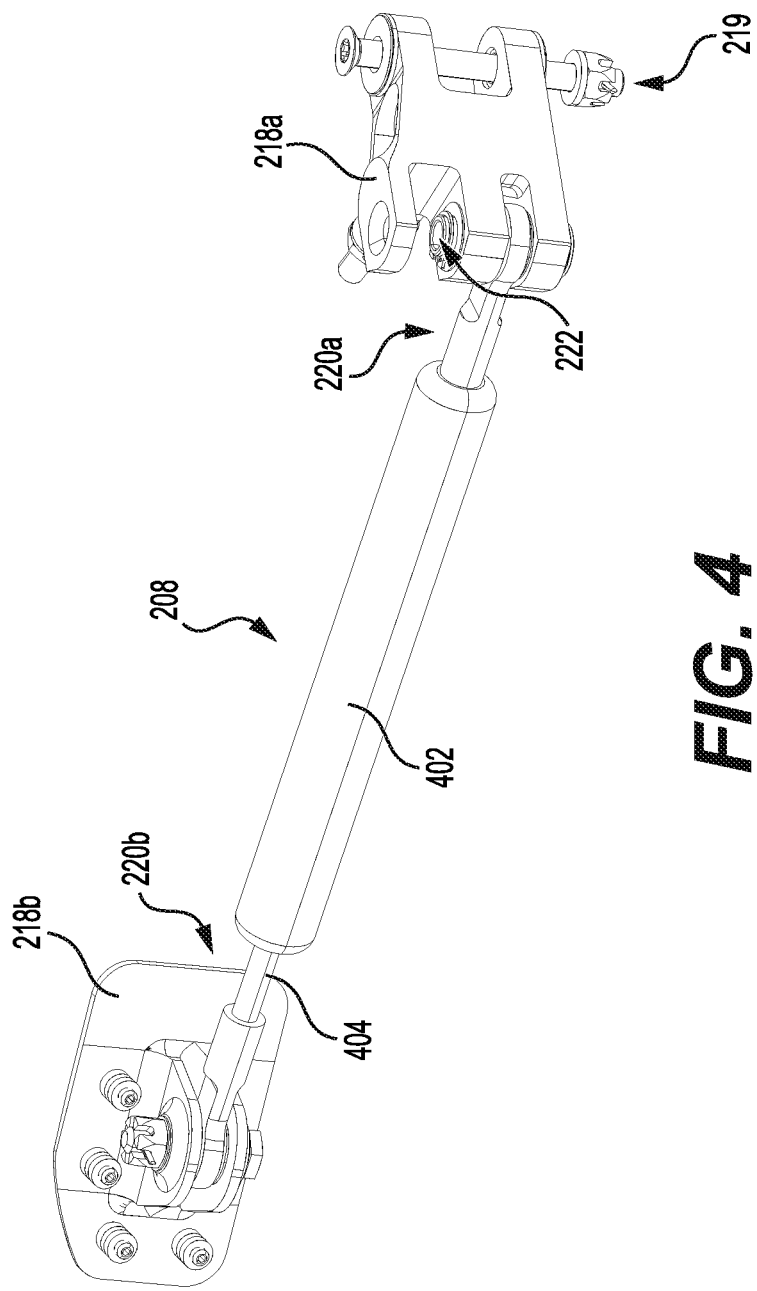
FIG. 4 illustrates a gas strut of the escape hatch system for some aspects.

At first end 216a, second stop arm 207 may be attached to escape hatch 202 via an over-travel bracket 218a (see FIGS. 2A and 4). In some aspects, first end 216a comprises a hole 322 (FIG. 3B) through which a fastener assembly 324 (FIG. 3C) may be inserted to secure second stop arm 207 to over-travel bracket 218a. Over-travel bracket 218a may be located near a top of escape hatch 202 and may be movably (e.g., rotatably or pivotably) coupled to escape hatch 202. In some aspects, over-travel bracket 218a is located proximal to a forward side of escape hatch 202. In aspects, over-travel bracket 218a may be pivotally coupled to escape hatch 202 via a fastening assembly 219 (see FIG. 4).

The first stop arm 206 and the second stop arm 207 may be rotatably coupled to each other. More particularly, second end 210b of first stop arm 206 may be pivotally coupled to second end 216b of second stop arm 207 at connecting point 214 (see FIG. 2A). As escape hatch 202 moves from an open position to a closed position (see FIGS. 2B and 2C), first stop arm 206 may rotate about connecting point 214 in one direction (e.g., a clockwise direction) and second stop arm 207 may rotate about connecting point 214 in a second direction opposite the first direction (e.g., a counterclockwise direction). When escape hatch 202 is in the closed position, second stop arm 207 may be substantially parallel to first stop arm 206 and may be laterally displaced therefrom (see FIG. 2B). When escape hatch 202 is in the open position, stop arms 206, 207 may be fully extended and may be substantially in-line with one another (i.e., form an approximately 180-degree angle, as shown in FIG. 2A).

Gas strut 208 may have a first end 220a and a second end 220b (see FIG. 4). At first end 220a, gas strut 208 may be coupled to over-travel bracket 218a (to which first end 216a of second stop arm 207 is also coupled). At second end 220b, gas strut 208 may be coupled to escape hatch 202 via a second escape hatch bracket 218b (see FIG. 4). Second escape hatch bracket 218b may be coupled to escape hatch 202 and may be located proximal to an aft side of escape hatch 202.

In some aspects, gas strut 208 is configured as a rate-controlled strut for damping a wind gust load (or any other load applied to escape hatch 202) that may otherwise cause damage to escape hatch 202 and/or supporting structure 204. As discussed in more detail herein, when escape hatch 202 is opened (e.g., rotated in a clockwise direction), first stop arm 206 and second stop arm 207 may over-center to lock escape hatch 202 and preclude escape hatch 202 from closing shut (e.g., without manual intervention). When escape hatch 202 is open, a wind gust or other load that may cause escape hatch 202 to over-travel (i.e., may cause escape hatch 202 to rotate further in the clockwise direction) may be damped by gas strut 208. That is, as the over-travel bracket 218a pivots while the stop arms 206 and 207 are over-centered to allow escape hatch 202 to begin to over-travel in response to the load, gas strut 208 may dampen the load and store the energy such that the stored energy may be expelled as gas strut 208 retracts and the over-travel bracket 218a returns to nominal position (while escape hatch 202 is still in the open position). Gas strut 208 may release the stored energy at a reduced force relative to the force applied to escape hatch 202 that engages gas strut 208. Gas strut 208 is discussed in further detail below with respect to FIG. 4.

FIG. 2B illustrates a close-up perspective view of escape hatch 202 when system 200 is in a closed position for some aspects with supporting structure 204 removed for clarity of illustration. Also illustrated in FIG. 2B is supporting structure bracket 212, which is coupled to first stop arm 206, and specifically, to first end 210a thereof. Supporting structure bracket 212 may be affixed to supporting structure 204.

Figure 2C:
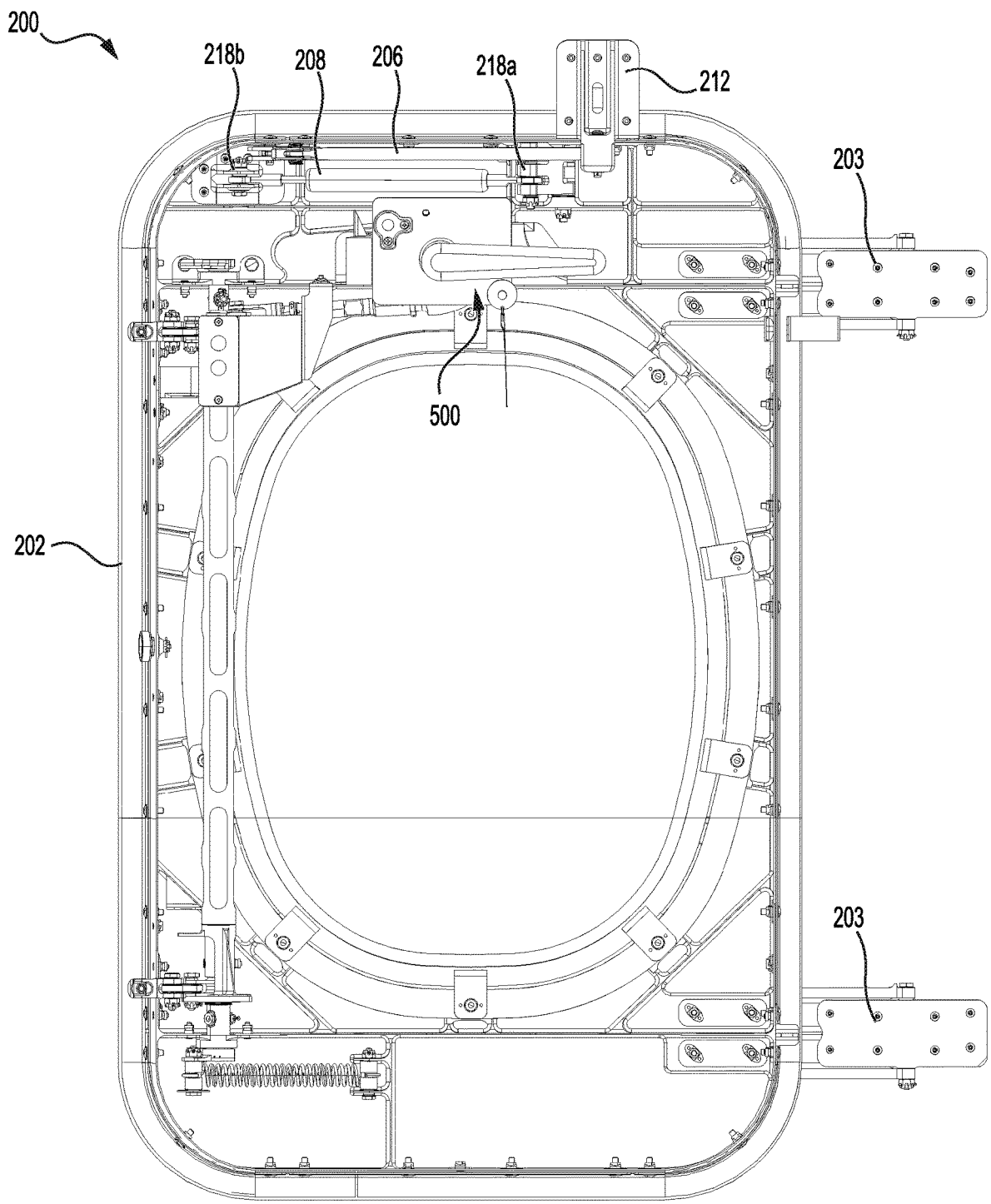
FIG. 2C illustrates a planar view of the escape hatch for some aspects.

FIG. 2C illustrates a planar view of escape hatch 202 in the closed position for some aspects. As discussed above, first stop arm 206 and second stop arm 207 may be substantially parallel and laterally displaced from one another when escape hatch 202 is closed. When escape hatch 202 is in the closed position, gas strut 208 may be disposed substantially below stop arms 206 and 207.

In aspects, a protruding member 302 protrudes from first stop arm 206 at second end 210b (see FIG. 3A). Protruding member 302 may be associated with first stop arm 206. In some aspects, protruding member 302 may be a part of first stop arm 206 (e.g., protruding member 302 may be unitary with first stop arm 206 or may be a separate component coupled to second end 210b of first stop arm 206). Protruding member 302 may have a hole 304 extending therethrough. Hole 304 may receive a fastener assembly 306 (see FIG. 3C) for coupling second end 216b of second stop arm 207 to protruding member 302 of first stop arm 206. Fastener assembly 306 may comprise washers, pins, (e.g., clevis pins), sleeves, nuts, screws, bolts, and the like or any combination thereof.

In some aspects, protruding member 302 may include a corner end stop 303 (see FIG. 3A). As described in more detail herein, corner end stop 303 of first stop arm 206 may be configured to abut against second end 216b of second stop arm 207 when escape hatch 202 is in an open position, to preclude further rotational motion of first stop arm 206 relative to second stop arm 207.

In aspects, a catch 308 may be movably (e.g., rotatably) secured to first stop arm 206 at or proximate second end 210b via a fastener assembly 309. Catch 308, in some aspects, may be generally V-shaped and have a trigger end 311a and lock end 311b (FIG. 3C).

In some aspects, first stop arm 206 and second stop arm 207 are configured to over-center when escape hatch 202 opens. That is, when escape hatch 202 is in the open position (FIG. 2A), first stop arm 206 and second stop arm 207 may be configured to lock such that a person must manually move stop arms 206 and/or 207 out of the over-center position (e.g., by applying a force near connecting point 214) for escape hatch 202 to be closed shut. As discussed herein, first stop arm 206 and second stop arm 207 may be locked when one or more projecting members of second arm 207 interface with (e.g., are abuttingly received by) catch 308 of first stop arm 206. Escape hatch 202 may not automatically swing shut if left in the open position, and as such, passenger egress may proceed efficiently because escape hatch 202 may stay open without having to be held open by a passenger. In some aspects, the user may have to manually decouple catch 308 of first stop arm 206 from second stop arm 207 for escape hatch 202 to be allowed to swing shut. For example, the user may have to push on stop arms 206 and 207 near connecting point 214 and push trigger end 311a of catch 308 to disassociate lock end 311b of catch 308 from the projecting members of second arm 207 to close escape hatch 202. The catch 308 may therefore be usable to selectively unlock the first stop arm 206 from the second stop arm 207.

A hole 310 may extend through first stop arm 206 at first end 210a thereof (see FIG. 3A). Hole 310 may be configured to receive a fastener assembly 312 (see FIG. 3C) for coupling first stop arm 206 to supporting structure bracket 212. In aspects, fastener assembly 312 (see FIG. 3D) may secure first end 210a of first stop arm 206 to supporting structure bracket 212. Fastener assembly 312 may comprise any combination of washers, sleeves, pins, bolts, screws, and the like.

A connecting member 315 may be provided at second end 216b of second stop arm 207 (see FIGS. 3B and 3C). Connecting member 315 may include a first wall 316a and a second wall 316b facing the first wall 316a. First wall 316a and second wall 316b may extend generally parallel to each other and define a gap or opening 318 therebetween. In aspects, at least a portion of gap or opening 318 may be closed by an end stop surface 319 (see FIG. 3C). End stop surface 319 may be inwardly adjacent (e.g., extend between a portion of) first wall 316a and second wall 316b.

First wall 316a of connecting member 315 of second stop arm 207 may include a hole 320a (see FIG. 3B) that extends through first wall 316a. Second wall 316b of connecting member 315 may likewise include a hole 320b (FIG. 3B) that extends through second wall 316b. Hole 320a and 320b may be aligned with each other.

In aspects, protruding member 302 extending from second end 210b of first stop arm 206 may be inserted into gap 318 of connecting member 315 at second end 216b of second stop arm 207. Fastener assembly 306 (FIG. 3C) may be passed through each of hole 320a and 320b in connecting member 315 of second stop arm 207 and hole 304 in protruding member 302 of first stop arm 206 to pivotably couple first stop arm 206 to second stop arm 207 (and more specifically, to rotatably couple first stop arm 206 at second end 210b to second stop arm 207 at second end 216b).

First wall 316a of connecting member 315 may have a projecting member or projection 321a (see FIG. 3B). Second wall 316b of connecting member 315 may have a projecting member or projection 321b. Projecting members 321a and 321b may be lockingly received by lock end 311b of catch 308 when escape hatch 202 is opened and end stop surface 319 of second stop arm 207 abuts corner end stop 303 of first stop arm 206. Contact of corner end stop 303 of protruding member 302 of first stop arm 206 with end stop surface 319 of connecting member 315 of second stop arm 207 may prevent further rotation of first stop arm 206 relative to second stop arm 207.

FIG. 3C illustrates a perspective view of first stop arm 206 and second stop arm 207 in the closed position for some aspects. As noted, at first end 216a, second stop arm 207 may be attached to escape hatch 202 via over-travel bracket 218a. In some aspects, a fastener assembly 324 (FIG. 3C) may secure first end 216a of second stop arm 207 to over-travel bracket 218a. Fastener assembly 324 may comprise any combination of washers, sleeves, pins, bolts, screws, and the like.

Figure 3D:
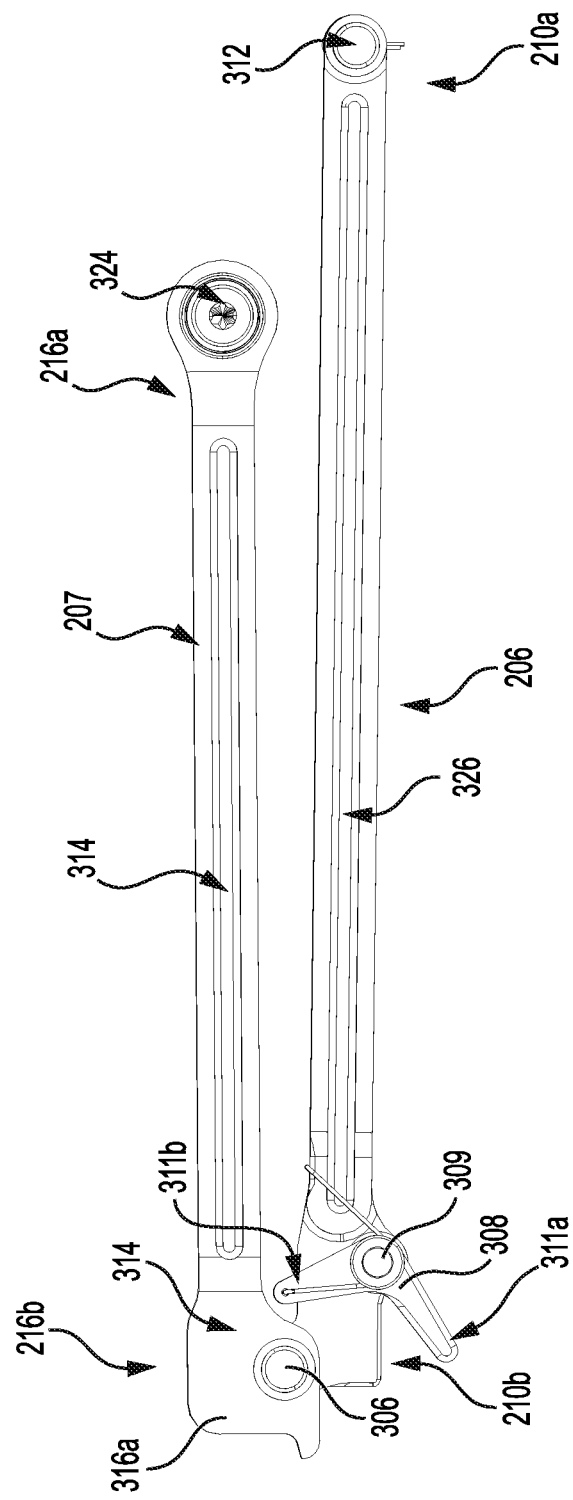
FIG. 3D illustrates a top-down view of the first stop arm and the second stop arm pivotally coupled to each other, for some aspects.

FIG. 3D illustrates a top-down view of first stop arm 206 and second stop arm 207 in the closed position for some aspects. As described above, when escape hatch 202 is closed, second stop arm 207 may be substantially parallel to first stop arm 206 and laterally displaced therefrom.

FIG. 4 illustrates gas strut 208 connected to over-travel bracket 218a at first end 220a and to second escape hatch bracket 218b at second end 220b for some aspects. An opening 222 in over-travel bracket 218a may receive first end 216a of second stop arm 207. In some aspects, over-travel bracket 218a is pivotally coupled to escape hatch 202 and can rotate relative to escape hatch about an axis.

In some aspects, over-travel bracket 218a allows for escape hatch 202 to over-travel when first stop arm 206 and second stop arm 207 are at a maximum stay arm length (i.e., when stop arms 206 and 207 form about a 180° angle) to absorb an applied load to escape hatch 202 when in the open position. As previously described, gas strut 208 may be configured as a rate-controlled damping strut for damping loads applied to escape hatch 202. In some aspects, gas strut 208 functions as an over-travel mechanism for system 200.

One having skill in the art understands that the concept of over-center is based on the principle of mechanical advantage, where a stable position is achieved by crossing a specific threshold or point. Systems involving an over-center link, for instance, typically involve a pivot or fulcrum point around which the system operates. As the system is manipulated, such as through the application of force or movement, it reaches a critical point called the "over-center position." At this point, the mechanical arrangement locks into place or is otherwise in a secured configuration, maintaining stability and preventing further movement or undesired changes.

In some aspects, the first stop arm 206 and second stop arm 207 are over-centered (i.e., are in an over-center position) when end stop surface 319 of connecting member 315 of second stop arm 207 abuts corner end stop 303 of protrusion 302 of first stop arm 206, thereby preventing escape hatch 202 from rotating further away from the closed position. When first stop arm 206 and second stop arm 207 are over-centered in this manner, a load applicable to further open escape hatch 202 by causing over-travel bracket 218a to rotate in an outward direction is dampened by gas strut 208. The load may, e.g., be a load that would have caused escape hatch 200 to open uncontrollably but for escape hatch stay system 202, e.g., gas strut 208 thereof.

Gas strut 208 may comprise a tube 402 and a rod 404. Rod 404 may extend inside of tube 402 and be coupled to a piston (not shown) at a distal end thereof within tube 402. When a load is applied to escape hatch 202, tube 402 may be pulled onto rod 404. In some aspects, the applied load pulls rod 404 out from tube 402. Tube 402 may be filled with a gas (e.g., nitrogen). Thus, as tube 402 is pulled from rod 404, rod 404 may drive the piston to compress the gas therein. Tube 402 may also comprise oil or another lubricant to damp the movement of the piston. This compression leads to an increase in internal pressure within tube 402. The increase in pressure allows for gas strut 208 to dampen the applied load because, as the pressure increases, more work is required for tube 402 to be pulled from rod 404, thereby slowing the rotation of escape hatch 202. Internally, gas strut 208 may comprise a plurality of orifices configured to release the stored energy at a controlled rate to minimize damage to the structure surrounding escape hatch 202. After gas strut 208 reaches a maximum extended travel thereof, the gas may expand and allow the gas strut 208 to return to a retracted length while expelling the stored energy at a controlled rate. When gas strut 208 returns to the retracted length, the escape hatch 202 will still be in the open position. The use of a rate-controlled gas strut 208 may reduce the stress and/or strain on escape hatch 202 and supporting structure 204 due to excessive loads applied to escape hatch 202.

Handle Assembly

Figure 5A:
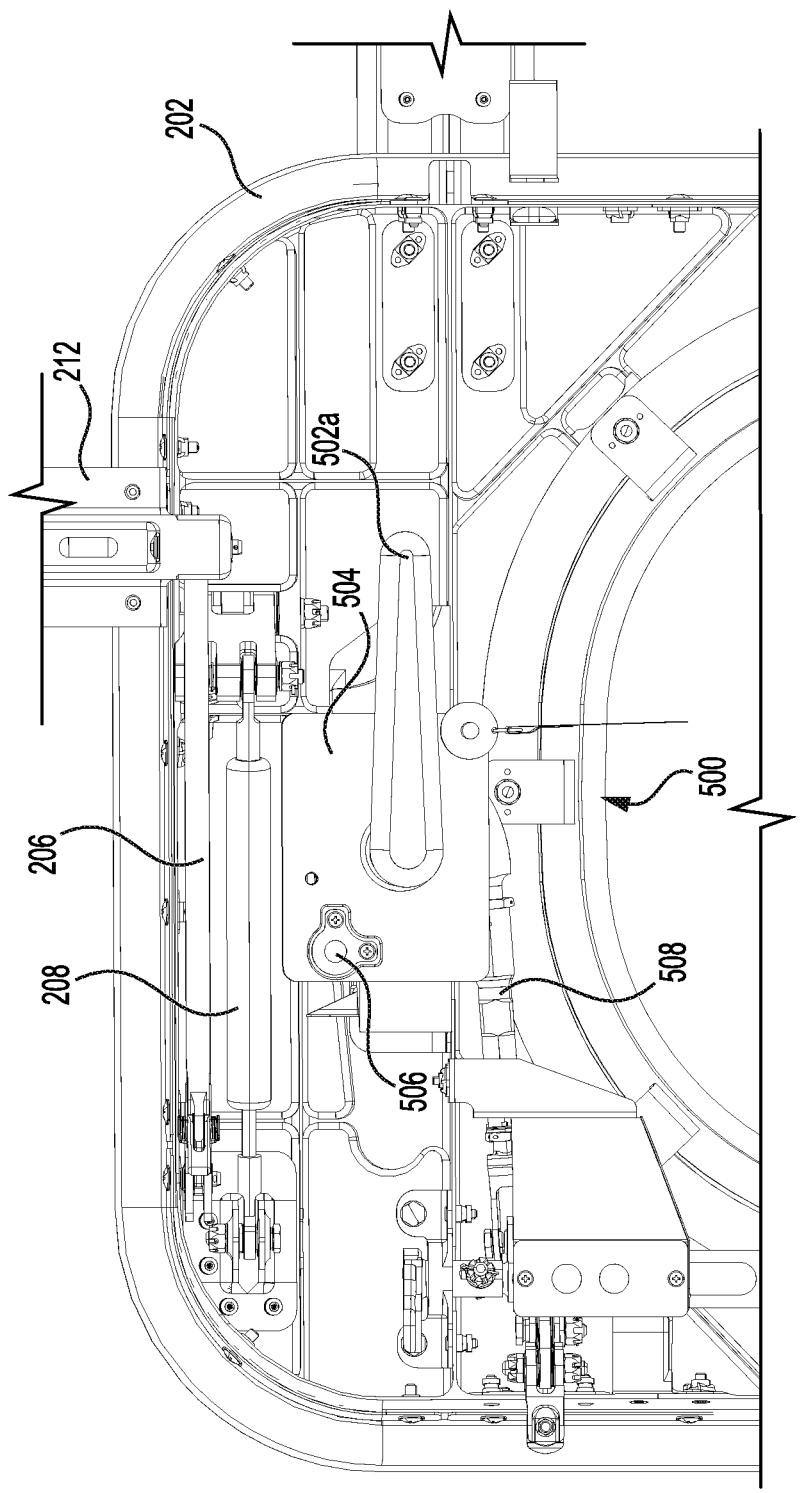
FIG. 5A illustrates an interior view of a handle assembly for the escape hatch for some aspects.

Focus is directed now to FIG. 5A to illustrate operation of handle assembly 500 for unlocking and opening escape hatch 202. In aspects, a handle of handle assembly 500 may be utilized by a user to open escape hatch 202 in a single rotational motion with a single hand. The design of an escape hatch latching mechanism for the escape hatch stay system 200 described above may require a locking feature to restrain the escape hatch latching mechanism from back driving. This locking feature may have to be actuated prior to actuating the rest of the latching system. This sequential actuation may lead to difficulties in providing an easy-to-use handle assembly that can overcome all of the locking features in a single motion for passenger egress. Thus, to improve and simplify the user experience of opening escape hatch 202, it may be desirable to provide a handle assembly 500 that unlocks both locking features in a single motion that can be performed with a single hand.

The opening of escape hatch 202 using handle assembly 500 may proceed as follows. The handle assembly 500 may comprise an interior handle and an exterior handle. A user may rotate either handle in a first rotational direction to open escape hatch 202. A first arc of rotation may unlock the handles by rotating a series of cam plates, which may move a tumbler-flag device that unlocks the handles from a locked position. In aspects, the first arc of rotation may be between about 5° and about 50°. In some aspects, the first arc of rotation may be between about 10° and about 30°. In some aspects, the first arc of rotation is about 15°. A second arc of rotation may then unlock a latching mechanism that is configured to unlatch a set of toggle latches. When the toggle latches are unlatched, escape hatch 202 may be unlocked and permitted to open such that egress via escape hatch 202 is possible. In some aspects, the first rotational direction is a clockwise direction. In other aspects, the first rotational direction is counterclockwise. The components of the handle assembly 500 are described in further detail below.

Figure 5B:
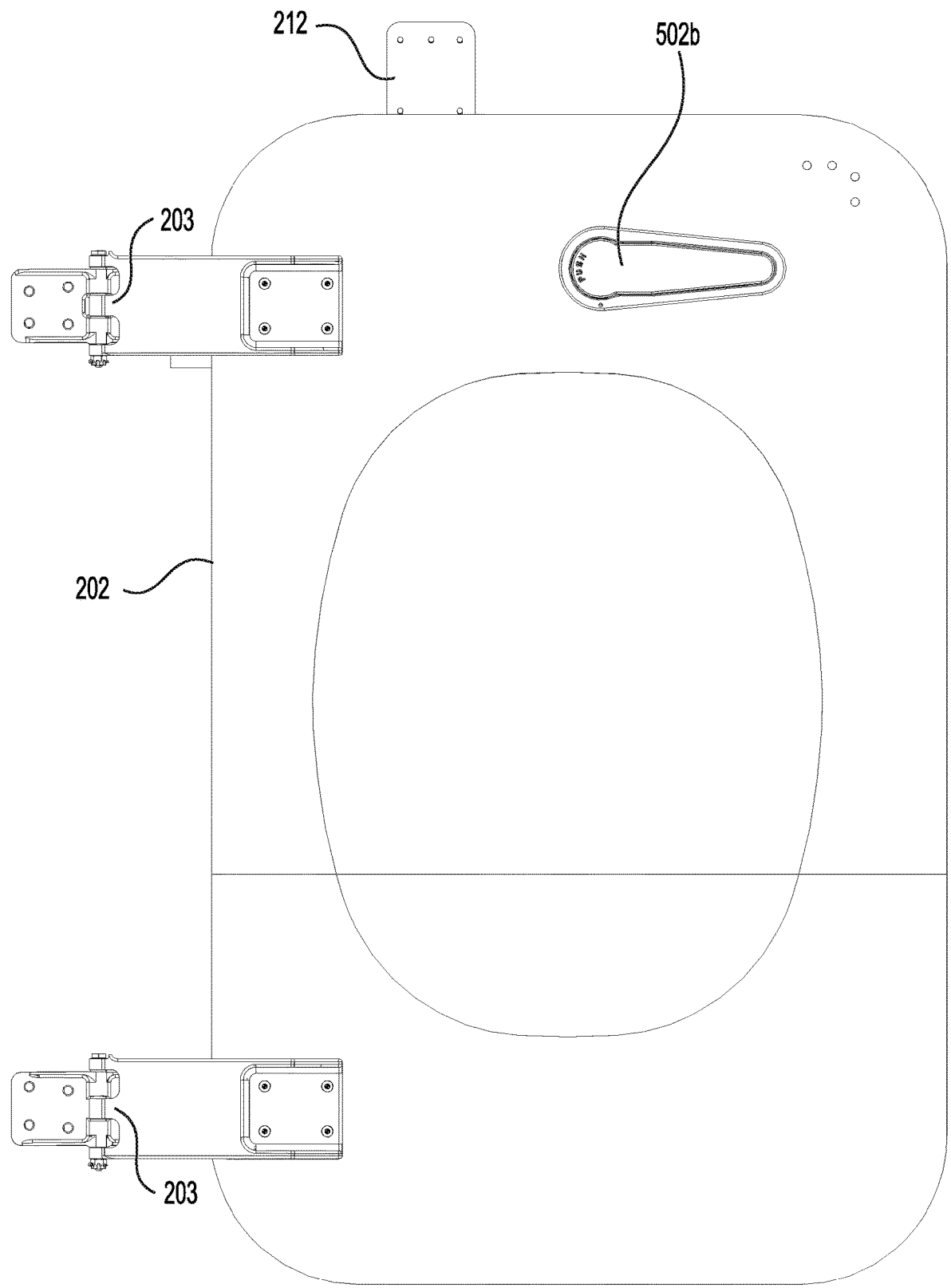
FIG. 5B illustrates an exterior view of the escape hatch for some aspects.

FIG. 5A illustrates handle assembly 500 for some aspects, and FIG. 5B illustrates an exterior view of escape hatch 202 for some aspects. Handle assembly 500 may comprise an interior handle 502a and an exterior handle 502b. Interior handle 502a may extend out of a plate 504. Plate 504 may comprise a window 506 through which a flag may be viewed. When handles 502a and 502b are in the locked position, the flag may be visible in window 506. As such, a person passing by escape hatch 202 may ascertain whether handle assembly 500 is locked based on the visibility of the flag within window 506. When either internal handle 502a or exterior handle 502b is rotated through the first arc of rotation, the flag may be moved out of window 506 to indicate that handles 502a and 502b are unlocked.

Interior handle 502a may be used to open escape hatch 202 from the interior of the aircraft, and exterior handle 502b may be used to open escape hatch 202 from an exterior of the aircraft. Interior handle 502a may be substantially similar to exterior handle 502b. In some aspects, exterior handle 502b is flush with an exterior of escape hatch 202 such that exterior handle 502b does not protrude into the air stream. In some aspects, exterior handle 502b is configured to be pushed inwards to release exterior handle 502b from the flushed position, thereby allowing a user to operate exterior handle 502b. Also illustrated in FIGS. 5A and 5B is an output rod 508, which may be configured to unlock the latching system when driven by the rotation of handles 502a and 502b after the handles 502a and 502b are unlocked.

Figure 5C:
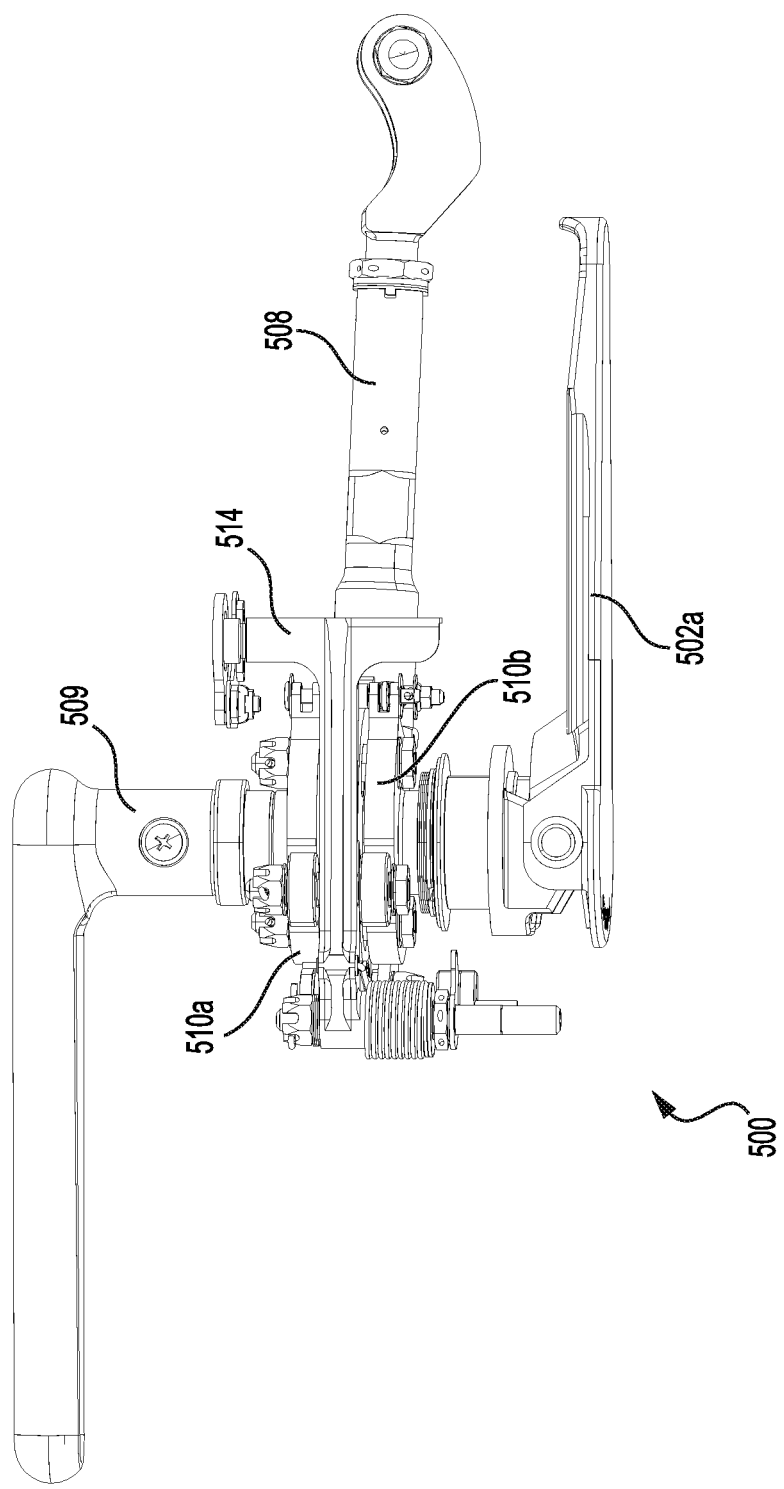
FIG. 5C illustrates a top-down view of the handle assembly for some aspects.

FIG. 5C illustrates a top-down view of handle assembly 500 for some aspects, and FIG. 5D illustrates an interior-looking, planar view of handle assembly 500 for some aspects. An interior cam 510a, an exterior cam 510b, and a middle cam 512 may be coupled to an exterior (i.e., about the circumference) of shaft 509. Thus, cams 510a, 510b, and 512 may be concentric with shaft 509. Cams 510a, 510b, and 512 may be arranged such that interior cam 510a is located furthest interior, middle cam 512 is located exterior relative to interior cam 510a, and exterior cam 510b is located exterior relative to middle cam 512. Thus, interior cam 510a and exterior cam 510b may sandwich middle cam 512.

Interior handle 502a and exterior handle 502b may also be coupled to shaft 509. Rotation of either handle 502a or 502b may rotate shaft 509, which may drive cams 510a, 510b, and 512. Various washers, sleeves, and the like may be circumferentially coupled to shaft 509 for mating shaft 509 with cams 510a, 510b, and 512.

In aspects, a tumbler 514 comprising a flag may be provided. The tumbler 514 may also be referred to herein as flag-tumbler 514. When in the locked position, flag-tumbler 514 may prevent ratcheting and/or inertial loads from back driving handles 502a and 502b. When driven, cams 510a, 510b, and 512 may disengage flag-tumbler 514 from a locked position. Disengagement of flag-tumbler 514 may permit full rotation of handles 502a and 502b to allow escape hatch 202 to be fully opened, as discussed further below.

Figure 5E:
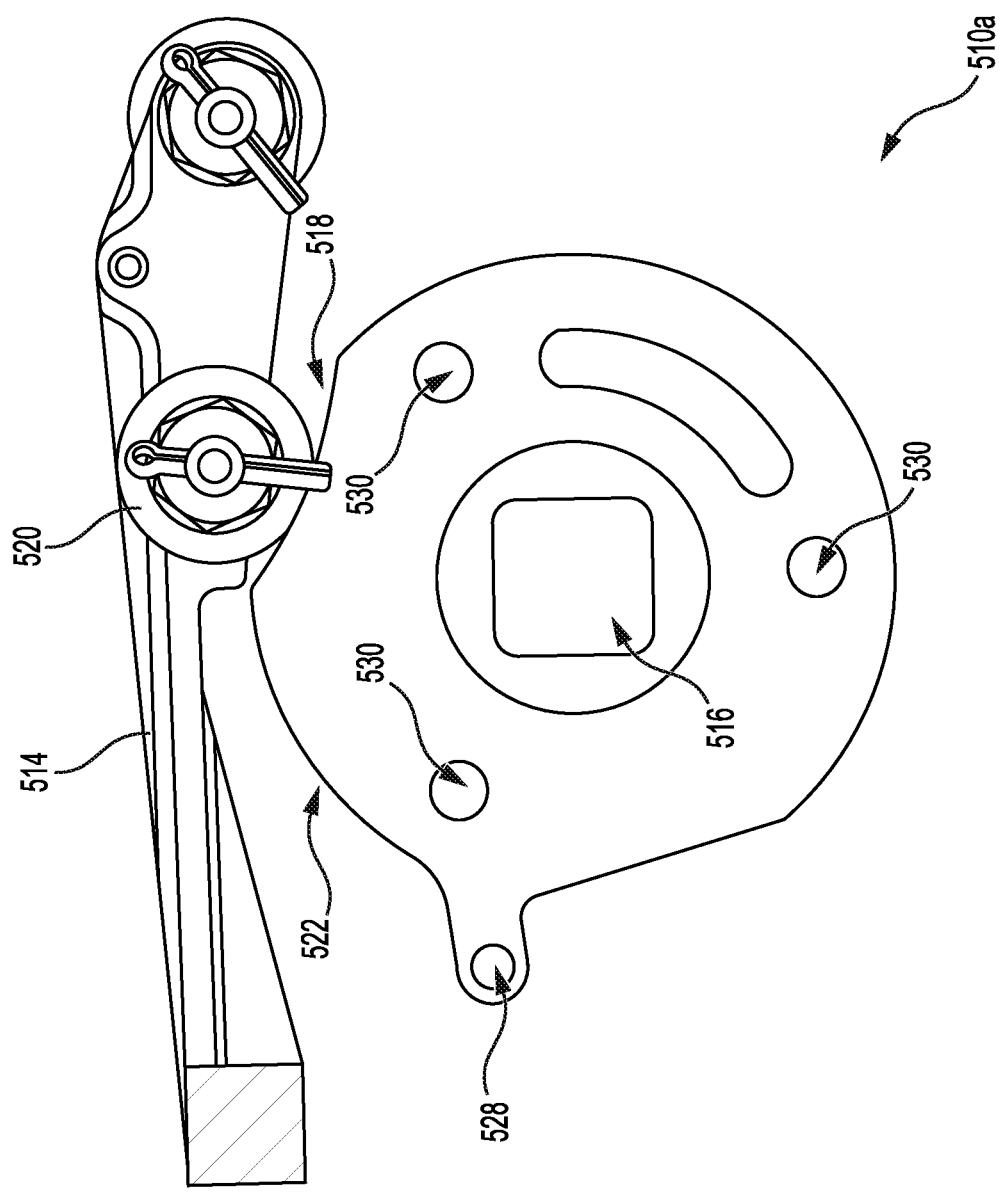
FIG. 5E illustrates an interior cam plate for the handle assembly for some aspects.

Looking now at FIG. 5E, interior cam 510a and flag-tumbler 514 are illustrated for some aspects. Interior cam 510a may be substantially similar to exterior cam 510b. For example, interior cam 510a and exterior cam 510b may have substantially the same cam profile.

Interior cam 510a may comprise a hole 516 for receiving shaft 509. Interior cam 510a may also comprise a concave profile section 518 and a convex or curved profile section 522. Flag-tumbler 514 may have a bearing 520, and the bearing 520 may be rotatably associated with concave profile section 518 when handle assembly 500 is in the closed position. In aspects, concave profile section 518 may be in contact with bearing 520. A second bearing 520 may likewise be in contact with a concave profile section 518 of exterior cam 510b. The bearing 520 associated with interior cam 510a may also be referred to herein as first or inner bearing 520 and generally identical bearing 520 associated with exterior cam 510b may also be referred to herein as second or outer bearing 520.

Rotation of handle 502a may cause handle 502b to rotate therewith, and vice versa. As handles 502a and 502b are rotated in the first arc of rotation, they may cause the interior cam 510a and exterior cam 510b to rotate therewith. Rotation of interior cam 510a in the first rotational direction may cause the inner bearing 520 associated with the interior cam 510a to rotate and move off concave profile section 518 of the cam 510a onto curved profile section 522 of cam 510a. Similarly, rotation of exterior cam 510b in the first rotational direction may cause the outer bearing 520 associated with the exterior cam 510b to rotate and move off concave profile section 518 of the cam 510b onto curved profile section 522 of cam 510b. This movement of bearings 520 may force flag-tumbler 514 upwards and out of window 506, thereby visually indicating to a passenger that handles 502a and 502b are no longer locked. As interior cam 510a and exterior cam 510b are continually rotated in the first rotational direction through the second arc of rotation, one bearing 520 of flag-tumbler 514 may be translated along curved profile section 522 of interior cam 510a and the other bearing 520 of flag-tumbler 514 may be translated along curved profile section 522 of the exterior cam 510b.

In some aspects, interior cam 510a is coupled to exterior cam 510b via a fastener/fastener assembly that is received through connecting hole 528. Through holes 530 may also receive a fastener or fastener assembly for securing interior cam 510a, exterior cam 510b, and middle cam 512 together. For example, the fastener assembly may be any combination of screws, nuts, bolts, washers, sleeves, pins, and the like.

Figure 5F:
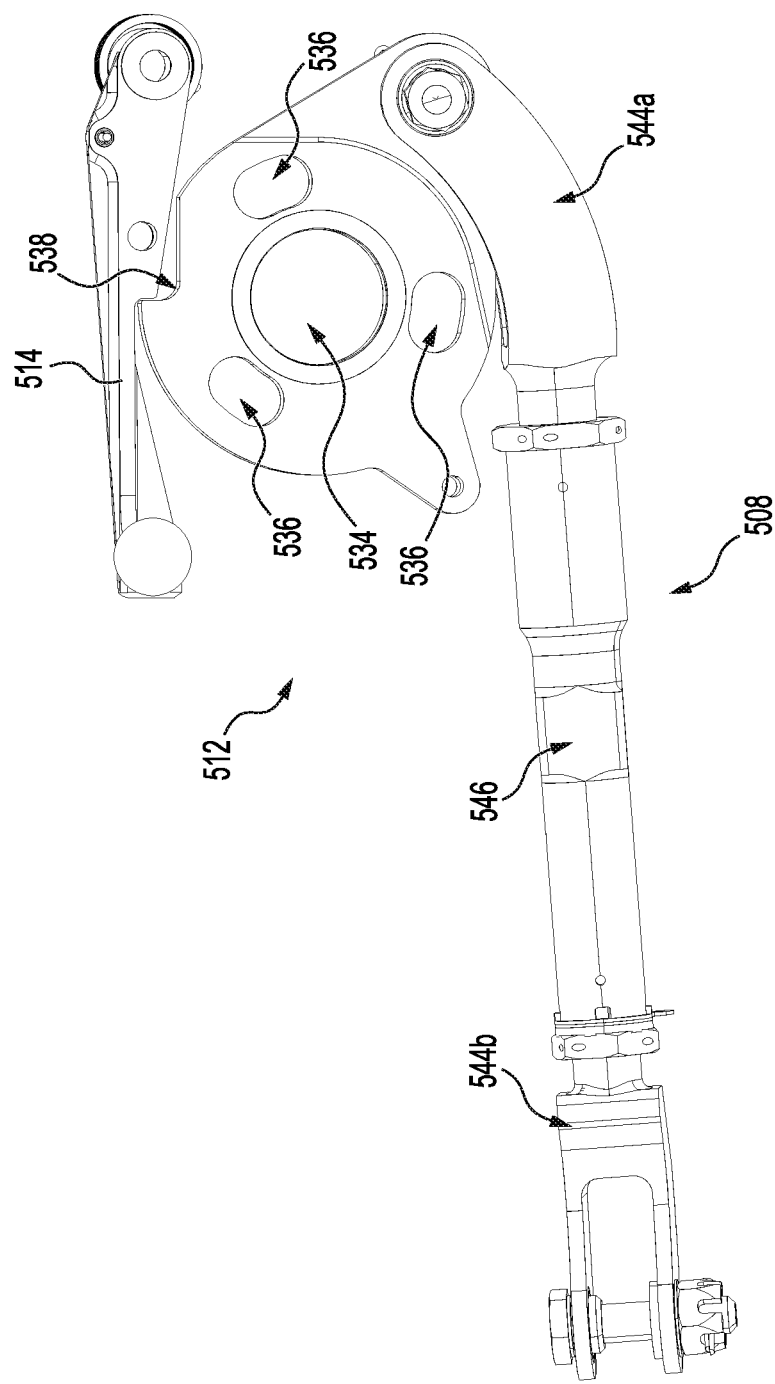
FIG. 5F illustrates a middle cam plate and an output shaft for the handle assembly for some aspects.
Figure 5G:
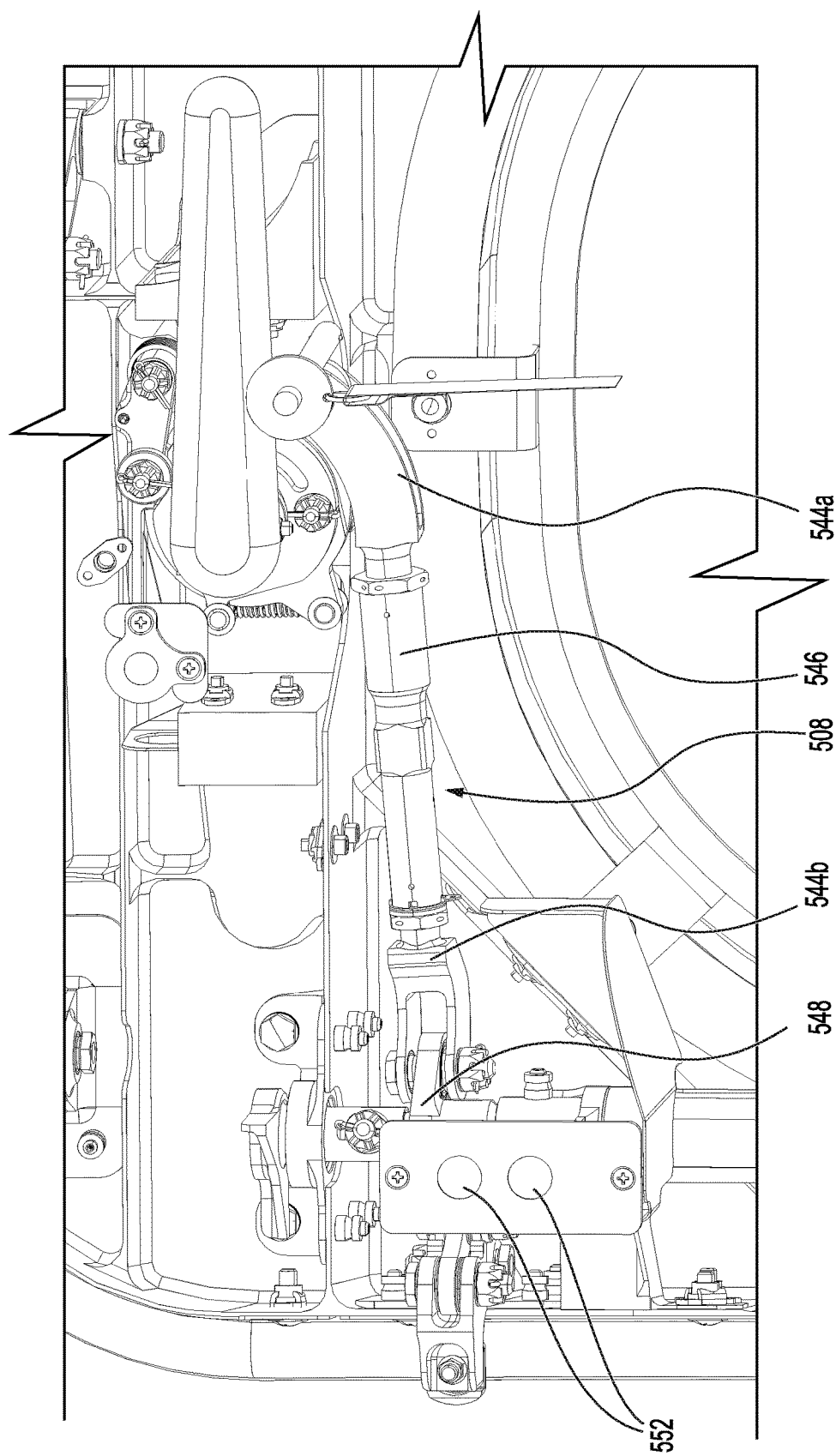
FIG. 5G illustrates a first view of an output arm for the handle assembly for some aspects.
Figure 5H:
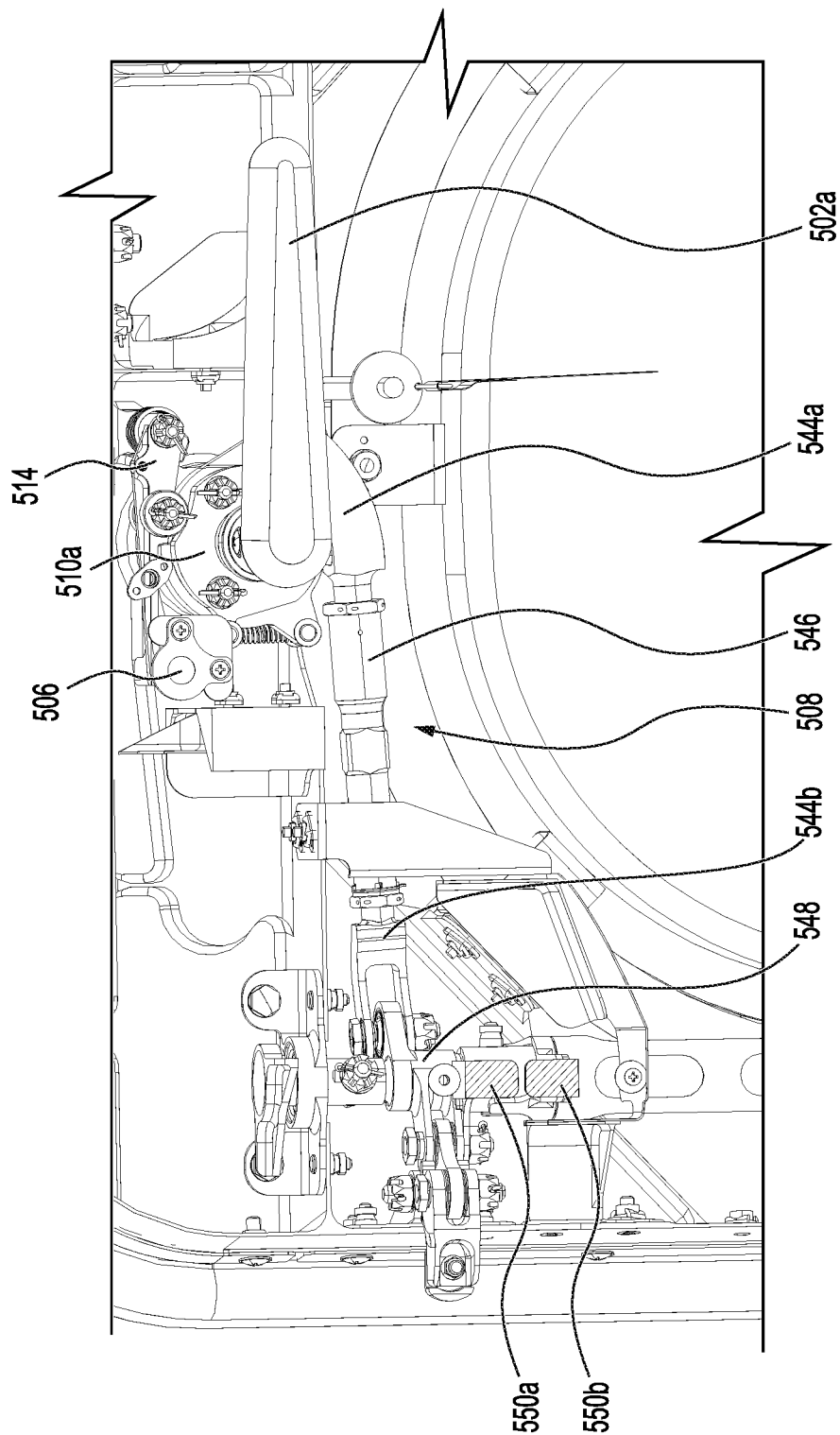
FIG. 5H illustrates a second view of the output arm for some aspects.

Looking now at FIGS. 5F, 5G, and 5H, output rod 508, middle cam 512, and flag-tumbler 514 are illustrated for some aspects. For clarity of illustration, bearing 520 has been omitted from flag-tumbler 514. As previously discussed, middle cam 512 may be disposed on shaft 509 and sandwiched between interior cam 510a and exterior cam 510b. Middle cam 512 may comprise a hole 534 for receiving shaft 509. Similarly, through holes 536 may be configured to receive fasteners/fastener assemblies to secure middle cam 512 to cams 510a and 510b. In some aspects, middle cam 512 is engaged subsequent to the first arc of rotation that drives cams 510a and 510b to unlock handles 502a and 502b.

Middle cam 512 may comprise a notched section 538 in which the outer circumference of the cam profile is notched. For example, notched section 538 may be shaped like the letter "L" as illustrated. The notched section 538 may abut against or be proximal to flag-tumbler 514, preventing rotation of handles 502a and 502b in the first rotational direction until bearing 520 is pushed upwards by cams 510a and 510b.

Once cam 510a pushes bearing 520 associated therewith upwards, bearing 520 may contact curved profile section 522 of cam 510a. Similarly, bearing 520 associated with cam 510b may be pushed upwards and may contact curved profile section 522 associated with cam 510b. The bearings 520 may maintain flag-tumbler 514 in the raised position and keep the flag out of window 506. Flag-tumbler 514 may ride on bearings 520 and cams 510a and 510b throughout the rotation of handle assembly 500. Further rotation of handle 502a and 502b may engage middle cam 512 to drive output rod 508 to unlock the latching system.

Output rod 508 may comprise a first end 544a and a second end 544b. Each end 544a and 544b may be formed as a C-arm. The first end 544a may be coupled to middle cam 512. As illustrated in FIG. 5H, second end 544b may be coupled to a sleeve 548. As middle cam 512 rotates in the first rotational direction, first end 544a and body 546 may translate in a substantially linear direction. The linear translation may be converted into rotational movement of second end 544b, thereby unlatching the toggle latch system.

Rotation of the second end 544b of output rod 508 may cause rotation of sleeve 548. Sleeve 548 may comprise a second flag 550a and a third flag 550b (FIG. 5G), which may be viewable through a second window 552 spaced apart from window 506. Second window 552 is omitted from FIG. 5H for clarity of illustration.

As discussed, rotation of bearings 520 associated with flag-tumbler 514 may cause the flag associated with flag-tumbler 514 to move out of window 506. Similarly, rotation of sleeve 548 may move second and third flags 550a and 550b out of window 552, thereby indicating that the latching system is unlocked. Once handles 502a and 502b are unlocked, and the latching system is then unlocked, escape hatch 202 may be fully openable. As discussed above, the dual-locking system may be unlocked in a single rotation of handle 502a and 502b— first arc of rotation may drive flag-tumbler 514 out of the locked position and move flag associated with flag-tumbler 514 out of window 506, and second arc of rotation may unlock the toggle latching system and move flags 550a and 550b out of window 552.

Figure 5I:
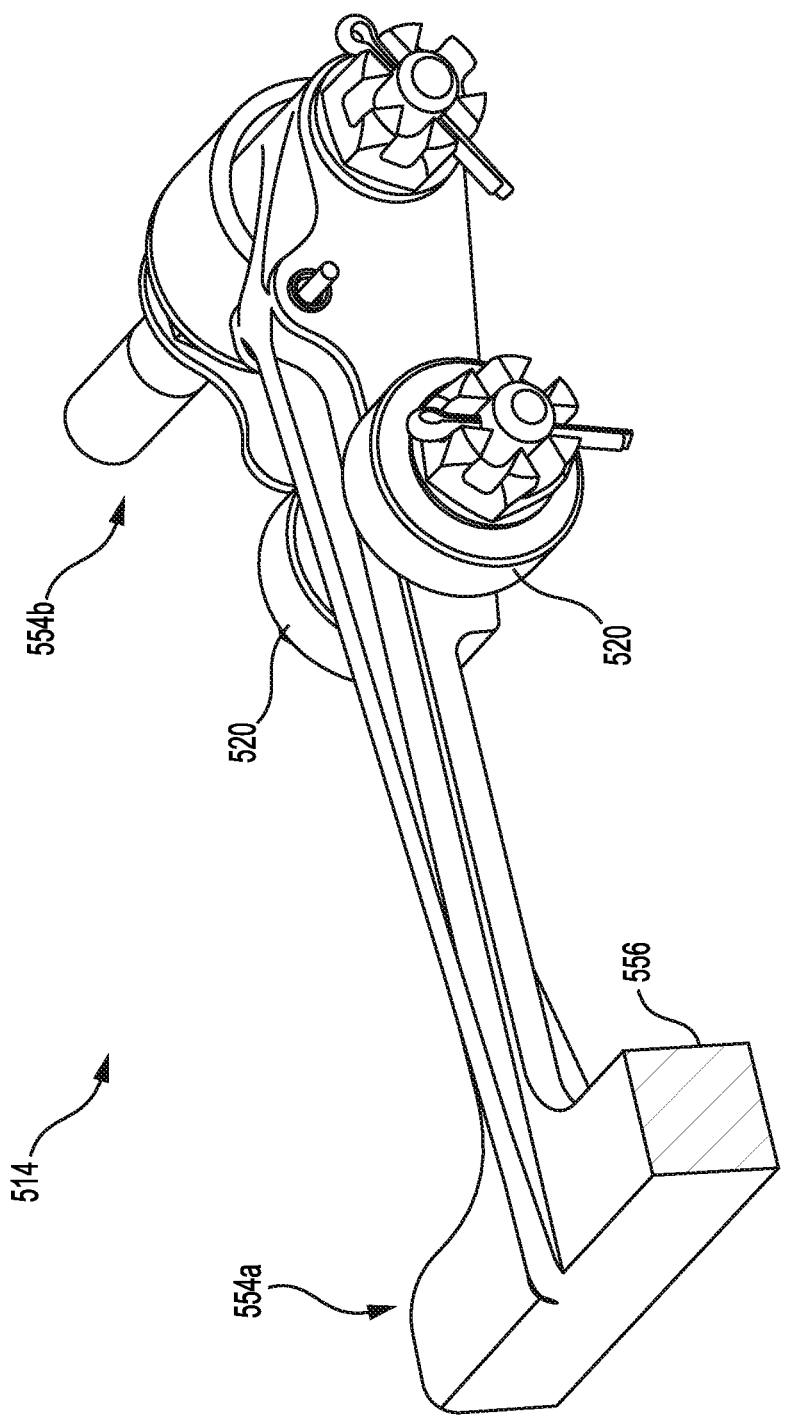
FIG. 5I illustrates a tumbler-flag for the handle assembly for some aspects.

FIG. 5I illustrates flag-tumbler 514 for some aspects. As discussed above, flag-tumbler 514 may be a dual-purpose mechanism that operates as a flag for escape hatch 202, and a tumbler latch for handles 502a and 502b to prevent ratcheting and/or inertial loads from back-driving handles 502a and 502b.

In aspects, flag-tumbler 514 may comprise a first end 554a and a second end 554b. First end 554a may comprise or be associated with first flag (e.g. flag portion 556), which, when handles 502a and 502b are locked, is visible within window 506. When cams 510a and 510b are driven by shaft 509, flag-tumbler 514 may be forced upwards, thereby moving flag portion 556 out of window 506 to indicate that handles 502a and 502b are no longer locked.

Many different arrangements of the various components depicted, as well as components not shown, are possible without departing from the spirit and scope of what is claimed herein. Embodiments have been described with the intent to be illustrative rather than restrictive. Alternative aspects will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An escape hatch stay system for an escape hatch of an aircraft, comprising:
    a first stop arm comprising a first end and a second end, the second end having associated therewith a protruding member and a catch, the protruding member comprising a stop;
    a second stop arm comprising a first end and a second end, the second end having associated therewith a connecting member, the connecting member comprising a gap, an end stop surface, and a projection;
    a gas strut having a first end and a second end, the second end coupled to the escape hatch; and
    a bracket pivotably coupled to the escape hatch, the first end of the second stop arm and the first end of the gas strut each being attached to the bracket;
    wherein:
    the first end of the first stop arm is coupled to a supporting structure of the aircraft and the second end of the first stop arm is rotatably coupled to the second stop arm;
    the first stop arm and the second stop arm are rotatably locked relative to each other to maintain the escape hatch in an open position when the stop abuts the end stop surface and the projection interfaces with the catch; and
    the gas strut is configured to dampen a load applicable to push the escape hatch open past the open position.

2. The escape hatch stay system of claim 1, wherein the gas strut comprises a rate-controlled damping strut.

3. The escape hatch stay system of claim 1, wherein the first stop arm and the second stop arm are each in an extended position when the first stop arm is rotatably locked relative to the second stop arm.

4. The escape hatch stay system of claim 1, wherein the first stop arm and the second stop arm are substantially parallel to and laterally displaced from each other when the escape hatch is in a closed position.

5. The escape hatch stay system of claim 1, wherein a fastener extends through each of the protruding member and the connecting member to rotatably couple the second end of the first stop arm to the second end of the second stop arm.

6. The escape hatch stay system of claim 1, wherein:
    the connecting member has a first wall and a second wall facing the first wall; and
    the projection includes a first projection associated with the first wall and a second projection associated with the second wall.

7. The escape hatch stay system of claim 1, wherein the catch has a lock end and a trigger end.

8. The escape hatch stay system of claim 2, wherein the trigger end is movable to selectively unlock the first stop arm from the second stop arm.

9. A method of using an escape hatch on an aircraft, comprising:
    movably coupling a second end of a first stop arm to a second end of a second stop arm;
    attaching a first end of the second stop arm and a first end of a gas strut to a bracket that is movably coupled to the escape hatch;
    locking the escape hatch in an open position by locking the first stop arm and the second stop arm such that there is no relative movement therebetween;
    damping, using the gas strut, a load applicable to push the escape hatch open past the open position; and
    disassociating a catch of the first stop arm from a projecting member of the second stop arm to unlock the escape hatch.

10. The method of claim 9, wherein the escape hatch moves from a closed position to the open position in a clockwise direction.

11. The method of claim 9, further comprising attaching a first end of the first stop arm to a support structure of the aircraft.

12. The method of claim 11, further comprising attaching a second end of the gas strut to the escape hatch.

13. The method of claim 9, wherein the catch is V-shaped and has a trigger end and a lock end.

14. The method of claim 13, wherein disassociating the catch from the projecting member comprises disassociating the lock end from the projecting member using the trigger end.

15. The method of claim 14, wherein the second stop arm, at the second end thereof, includes a connecting member with a hole and a stop.

16. An escape hatch stay system for an escape hatch of an aircraft, comprising:
    a first stop arm, a second stop arm, and a gas strut, the second stop arm rotatably coupled to the first stop arm and pivotably coupled to the gas strut via a bracket, the first stop arm rotatably lockable relative to the second stop arm to lock the escape hatch in an open position;
    wherein, a load applicable to push the escape hatch open past the open position is damped by the gas strut.

17. The escape hatch stay system of claim 16, wherein the first stop arm is coupled to a supporting structure that surrounds the escape hatch.

18. The escape hatch stay system of claim 16, further comprising a catch with a trigger end and a lock end.

19. The escape hatch stay system of claim 18, wherein the catch is associated with a second end of the first stop arm.

20. The escape hatch stay system of claim 19, further comprising a projection configured to interface with the catch to lock the first stop arm relative to the second stop arm.

* * * * *